United States Patent
Houze et al.

(10) Patent No.: US 11,128,892 B2
(45) Date of Patent: Sep. 21, 2021

(54) METHOD FOR SELECTING AT LEAST ONE IMAGE PORTION TO BE DOWNLOADED ANTICIPATORILY IN ORDER TO RENDER AN AUDIOVISUAL STREAM

(71) Applicant: Orange, Issy-les-Moulineaux (FR)

(72) Inventors: Patrice Houze, Chatillon (FR); Gregory Pallone, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 79 days.

(21) Appl. No.: 16/499,073

(22) PCT Filed: Mar. 27, 2018

(86) PCT No.: PCT/FR2018/050740
§ 371 (c)(1),
(2) Date: Sep. 27, 2019

(87) PCT Pub. No.: WO2018/178560
PCT Pub. Date: Oct. 4, 2018

(65) Prior Publication Data
US 2020/0045346 A1    Feb. 6, 2020

(30) Foreign Application Priority Data
Mar. 31, 2017   (FR) ...................................... 1752792

(51) Int. Cl.
*H04N 21/218*   (2011.01)
*H04N 21/81*    (2011.01)
(Continued)

(52) U.S. Cl.
CPC ... *H04N 21/21805* (2013.01); *H04N 21/2393* (2013.01); *H04N 21/4394* (2013.01);
(Continued)

(58) Field of Classification Search
None
See application file for complete search history.

(56) References Cited

U.S. PATENT DOCUMENTS 9,473,758 B1    10/2016  Long et al.
9,743,060 B1 *   8/2017  Matias ............... H04N 5/23238
(Continued)

FOREIGN PATENT DOCUMENTS

EP           3086217 A1    10/2016

OTHER PUBLICATIONS

J. Daniel, "Evolving views on HOA: from technological to pragmatic concerns", Ambisonics Symposium Jun. 25-27, 2009, Graz.
(Continued)

*Primary Examiner* — Junior O Mendoza
(74) *Attorney, Agent, or Firm* — David D. Brush; Westman, Champlin & Koehler, P.A.

(57) ABSTRACT

A method for selecting at least one image portion to be downloaded anticipatorily in order to render an audiovisual stream by a rendering device. The method includes: determining the location of a sound source in a spatialized audio component of the audiovisual content, determining a future observation direction on the basis of the determined location, selecting at least one portion of the image on the basis of the determined future observation direction, and downloading the at least one selected image portion.

11 Claims, 4 Drawing Sheets

Figure 1A:
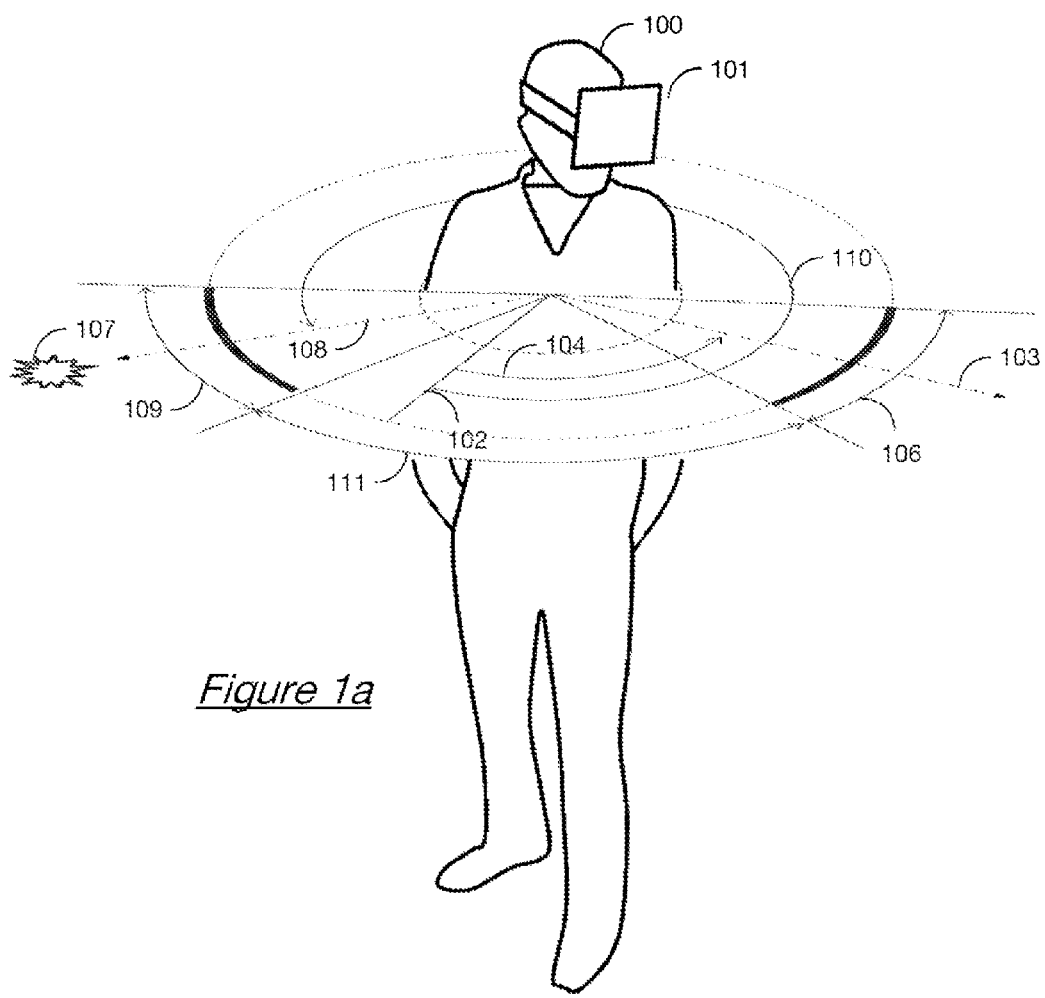

(51) Int. Cl.
*H04N 21/442* (2011.01)
*H04N 21/439* (2011.01)
*H04N 21/239* (2011.01)
*H04N 21/6587* (2011.01)

(52) U.S. Cl.
CPC ... *H04N 21/44218* (2013.01); *H04N 21/6587* (2013.01); *H04N 21/816* (2013.01)

(56) References Cited

U.S. PATENT DOCUMENTS

| | | | |
|---|---|---|---|
| 9,911,238 B2 * | 3/2018 | Doronichev | G06F 3/147 |
| 10,216,469 B2 | 2/2019 | Kang et al. | |
| 2016/0140396 A1 | 5/2016 | Feng | |
| 2016/0219325 A1 * | 7/2016 | Chu | G06T 15/20 |
| 2016/0300392 A1 * | 10/2016 | Jonczyk | G06T 7/536 |
| 2017/0048498 A1 | 2/2017 | Yook et al. | |
| 2017/0289219 A1 * | 10/2017 | Khalid | G06F 3/00 |

OTHER PUBLICATIONS

R. Irwan et al., "A method to convert stereo to multi-channel sound", Audio Engineering Society, Conference Paper, 19th International Conference, Schloss Elmau, Germany, Jun. 21-24, 2001.

J. Vilkamo, "Spatial Sound Reproduction with Frequency Band Processing of B-format Audio Signals", Master's Thesis, Espoo, May 28, 2008.

English translation of the International Written Opinion dated Jul. 10, 2018 for corresponding International Application No. PCT/FR2018/050740, filed Mar. 27, 2018.

International Search Report dated Jun. 28, 2018 for corresponding International Application No. PCT/FR2018/050740, filed Mar. 27, 2018.

Written Opinion of the International Searching Authority dated Jun. 28, 2018 for corresponding International Application No. PCT/FR2018/050740, filed Mar. 27, 2018.

\* cited by examiner

METHOD FOR SELECTING AT LEAST ONE IMAGE PORTION TO BE DOWNLOADED ANTICIPATORILY IN ORDER TO RENDER AN AUDIOVISUAL STREAM

CROSS-REFERENCE TO RELATED APPLICATIONS

This Application is a Section 371 National Stage Application of International Application No. PCT/FR2018/050740, filed Mar. 27, 2018, which is incorporated by reference in its entirety and published as WO 2018/178560 on Oct. 4, 2018, not in English.

FIELD

The invention belongs to the field of rendering audiovisual content, and relates more particularly to a method for optimizing the bandwidth when consulting panoramic audiovisual content from an immersive device.

PRIOR ART

Virtual headsets make it possible to view panoramic audiovisual content. They allow a user to immerse himself in the content that he is consulting by providing a 360° or 4π steradian video experience. Such headsets are generally provided with gyroscopic sensors that make it possible to determine the orientation of the user of the headset with respect to a reference direction. On the basis of the determined orientation, the device selects a portion of the panoramic content to be rendered in the headset corresponding to the direction in which the user is oriented. The user of the headset is thus able to look in different directions in order to observe various portions of the audiovisual content. This feeling of immersion is generally bolstered by stereoscopic or 3-dimensional rendering of the video component and by the spatialization of the audio component of the content. In this way, the portion of the video that is displayed and the position of the sound sources, when they are rendered by way of an audio headset, are modified so as to reflect each modification of orientation of the user's head.

Such an immersive device requires appropriate multimedia content. In particular, in order to be able to determine an image to be displayed that corresponds to each particular orientation of the user, the video component has to be a panoramic or spherical video. Such video sequences may for example be captured using a 360-degree acquisition device, such as for example using a panoramic camera.

It is understood that such digital content is particularly voluminous and that it requires a high bandwidth when it is consulted online, for example via streaming techniques.

One solution for reducing the amount of data to be transmitted when consulting such content consists in downloading only the portions of the video that are necessary to render the image corresponding to the current orientation of the user. In this way, the image portions that are outside of the user's field of view are not downloaded. However, this technique exhibits a drawback linked to the transmission time of the image portions, the changes of orientation of the user being forwarded with a delay in the rendering device.

It is possible to improve the situation by downloading, on the basis of a low-quality representation and in addition to the portions of the image that are necessary for viewing, portions of the image that are not in the user's field of view. Thus, when the user changes orientation, the corresponding portions of the image are available immediately with a reduced quality and with improved latency. When the orientation of the user has stabilized again, the image portions corresponding to the user's field of view are downloaded on the basis of a high-quality representation. Although it makes it possible to avoid excessive latency when the user moves, this technique exhibits the drawback of mobilizing a relatively high bandwidth in order to download images that will, for the most part, never be viewed by the user, as they will remain outside of his field of view.

There is therefore a need for a solution for optimizing the bandwidth used when consulting audiovisual content by way of an immersive viewing device such as a virtual headset, while at the same time offering users a good-quality experience.

The invention aims to improve the situation.

SUMMARY OF THE INVENTION

To this end, the invention relates to a method for selecting at least one image portion to be downloaded in order to render audiovisual content by way of a rendering device, the method being such that it includes steps of determining the location of a sound source in a spatialized audio component of the audiovisual content, of determining a future direction of observation on the basis of the determined location, of selecting at least one portion of the image on the basis of the determined future direction of observation, and of downloading the at least one selected image portion.

In order to be able to guide the selection of an image portion on which to focus bit rate, and therefore quality, the present invention proposes to use information coming from an audio component of the audiovisual content. The method thus proposes to determine image portions to be downloaded depending on the location of sound events in a spatialized audio environment. The invention takes advantage of the fact that, when a sound event occurs, a human being tends to turn toward the source of this sound event, since it generally also corresponds to a visual source to be identified. For example, when a person hears a door open behind him, he will generally turn around in order to ascertain who is entering the room. The method aims to anticipate this type of behavior by downloading image portions that will be in the user's field of view if he effectively orients himself toward the origin of the sound event. Likewise, when a sound source moves, its movement is able to be estimated so as to predict a future location of the sound source. In this way, image portions corresponding to the route taken by the sound source are able to be selected. The invention is advantageously applied in the broadcasting of panoramic video content, in particular when the user's field of view does not allow him to see the entire image. Thus, for example, if the subject is looking straight ahead in a silent scene, and a voice suddenly appears to the left, then the bit rate of the video portions corresponding to the left-hand portion of the image will be increased, whereas the bit rate of the video portions corresponding to the right-hand portion of the image will be reduced.

In a first variant, only the images thus selected are downloaded, the images that are not visible to the user not being downloaded so as to reduce the bandwidth necessary to consult the content.

In a second variant, all of the images of the content are downloaded on the basis of a first representation corresponding to a first image quality, the images selected according to the method being downloaded on the basis of a second representation the quality of which is higher than the first image quality.

The future direction of observation may correspond to an angle of rotation of the user from an initial observation position.

According to one particular embodiment, the location of the sound source on the basis of which the future direction of observation is determined is determined by analyzing at least one audio component of the audiovisual content.

The audio component of audiovisual content may comprise one or more channels. For example, stereo formats comprise two channels intended to be positioned to the right and to the left of the listener, the 5.1 format (surround) corresponding to 5 speakers in the horizontal plane and 1 subwoofer, or else the 5.1.2 format, which additionally comprises two elevated speakers. Other formats exist and may comprise any number of channels. The sound waves constituting these various audio channels are designed to directly feed a corresponding number of speakers arranged in a particular configuration. The invention thus proposes to determine the location of a sound source with respect to the position and the orientation of the user in the observed audiovisual scene, on the basis of analysis of at least one audio component of the audiovisual content. For example, the location of a sound event may be determined from the (known) position of the speaker whose power is highest.

According to one particular embodiment, the location of the sound source on the basis of which the future direction of observation is determined is determined by metadata associated with one or more audio components of the audiovisual content.

Some audio coding formats make provision to transmit sound objects comprising a sound (often mono) and associated metadata. The metadata indicate in particular the position at which this sound object should be perceived by the listener. Such an object is processed by a rendering device configured so as to generate an audio signal intended for one or more particular speakers, the generated audio signal being such that the sound object will be perceived by the user as coming from the location indicated in the metadata. One of the benefits of such an approach is that the rendering of the object will be adapted to the rendering system of the listener, even if the sound system that is used differs in terms of the number and the position of the speakers from the system that is used to produce the content. Thus, in such an embodiment of the invention, the location of a sound source is determined on the basis of metadata associated with the sound objects.

According to one particular implementation of the invention, the method is such that the at least one selected image portion furthermore comprises image portions visible from at least one intermediate direction of observation between a current direction of observation obtained on the basis of data coming from sensors associated with the rendering device and the determined future direction of observation.

The invention proposes to anticipate the route taken by the eyes or the head of the subject when he orients himself in the direction of a sound event. For example, when a user is looking straight ahead and a sound event is detected to his left, the invention proposes to select not only the image portions corresponding to the user's field of view when he is oriented toward the sound source, but also the image portions that are visible during the movement of the user.

In this way, when a user turns around because he has heard a particular noise, the images to be displayed during the rotation of the user are available immediately.

According to one particular embodiment, the intermediate direction of observation corresponds to a direction of observation between the current direction of observation and the future direction of observation when the user performs a rotation from the current direction of observation to the future direction of observation, in a direction that minimizes the amplitude of this rotation.

When a user performs a rotation from a first direction of observation to a second direction of observation, he may choose to turn around to the right (in the clockwise direction) or to the left (in the anticlockwise direction). Unless the second direction is exactly opposite the initial direction of observation, there is an optimum direction of rotation that minimizes the angle of rotation necessary for the user to orient himself in the second direction of observation. Given that it is highly likely that a user will perform a rotation in the direction that requires the smallest movement amplitude, the invention advantageously proposes to anticipate the downloading of the images that will be necessary to render the video during such a rotation. In this way, the method optimizes the use of the available bandwidth by not downloading the image portions that have a low probability of being viewed by the user.

The method proposes to determine, on the basis of the initial direction of observation and of the future observation position, an optimum direction of rotation that minimizes the rotation to be performed, or the rotations when rotations about a plurality of axes are necessary in order for the user to end up facing the direction of origin of the sound event.

The method thus comprises selection of at least one visible image portion by a user performing a rotation via the shortest path, from an initial direction of observation to the direction of observation determined by the location of the sound event.

Let us take the example of a user equipped with a virtual headset who is viewing 360-degree video content. When the user is oriented toward the north and he perceives a sound event to the east, it is likely that, by reflex, he will orient himself toward the east in order to determine the origin of the perceived noise. To orient himself toward the origin of the noise, the user may perform a 270 rotation to the west or else a 90° rotation to the east. It is likely that the user will instinctively choose the second option since it minimizes the rotation to be performed. The invention thus makes it possible to determine the most likely direction of rotation of the user on the basis of the origin of a sound event, so as to select image portions corresponding to intermediate directions of observation taken by the user during a rotation via the shortest path.

Of course, depending on the location of the sound event, the user may need to perform rotations about a vertical and/or horizontal axis. For example, if the origin of the sound event is situated to the upper left of the user, two rotations will be necessary in order for said user to position himself facing the event: a rotation to the left about a vertical axis, and an upward rotation about a horizontal axis. The shortest path to move from the initial direction of observation to the direction of observation in order to be facing the sound event corresponds to a simultaneous rotation about the two axes.

According to one particular embodiment, in which the determined location of the sound source is modified such that the user is incited to perform at least one rotation in a particular direction in order to orient himself toward the sound source.

When a sound event is detected at a location situated in a direction opposite the current direction of observation of the user, it is difficult to predict whether the user will turn around to the right or to the left. In such a case, the invention proposes to move the sound source so as to incite the user to turn around in one direction rather than another. In this way, the invention makes it possible to increase the likelihood of a user turning around in a direction for which image portions corresponding to intermediate directions of observation have been selected.

According to another aspect, the invention relates to a device for selecting at least one image portion to be downloaded in order to render audiovisual content by way of an immersive rendering device, the device being such that it includes:
- means for determining the location of a sound source in a spatialized audio component of the audiovisual content,
- means for determining a future direction on the basis of the determined location,
- means for selecting at least one portion of the image on the basis of the determined future direction of observation, and
- means for downloading the at least one selected image portion.

According to one particular implementation, the invention relates to a terminal comprising a selection device such as described above.

According to one particular implementation, the invention relates to a server comprising a selection device such as described above.

In one particular embodiment, the various steps of the method according to the invention are determined by computer program instructions.

As a result, the invention also targets a computer program including instructions for executing the steps of the selection method when said program is executed by a processor.

Such a program may use any programming language, and be in the form of source code, object code, or of intermediate code between source code and object code, such as in a partially compiled form, or in any other desirable form.

The invention relates lastly to an information medium able to be read by a processor and on which there is recorded a computer program comprising instructions for executing the steps of the selection method.

The information medium may be any entity or device capable of storing the program. For example, the medium may include a storage means, such as a ROM, for example a CD-ROM or a microelectronic circuit ROM, or else a magnetic recording means, for example a floppy disk or a hard disk. Moreover, the information medium may be a transmissible medium such as an electrical or optical signal, which may be routed via an electrical or optical cable, by radio or by other means. The program according to the invention may in particular be downloaded from an Internet network. As an alternative, the information medium may be an integrated circuit in which the program is incorporated, the circuit being designed to execute or to be used in the execution of the method in question.

The various aforementioned embodiments or implementation features may be added, independently or in combination with one another, to the steps of the selection method such as defined above.

The terminals, servers, devices and programs have at least advantages analogous to those conferred by the selection method.

LIST OF THE FIGURES

Figure 1B:
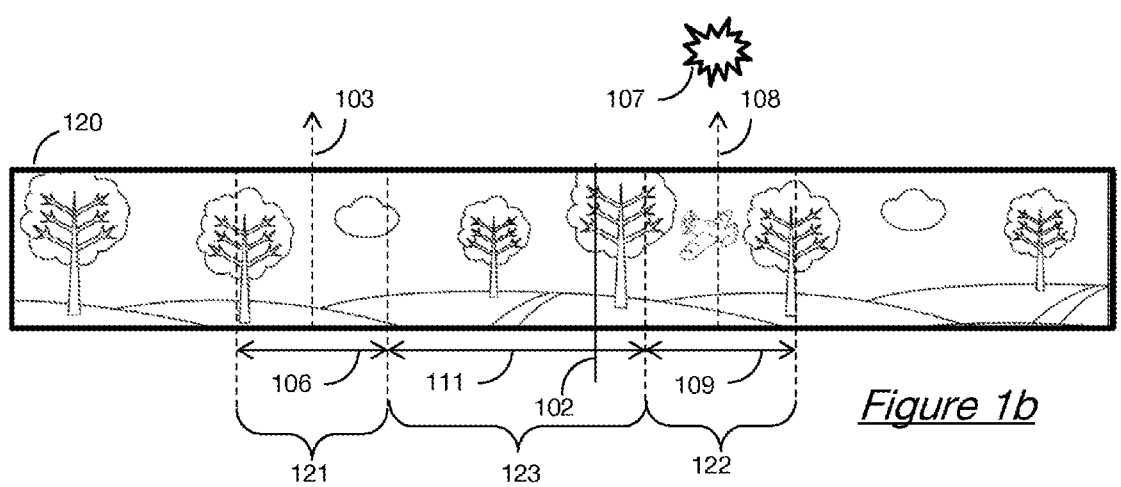
Figure 2:
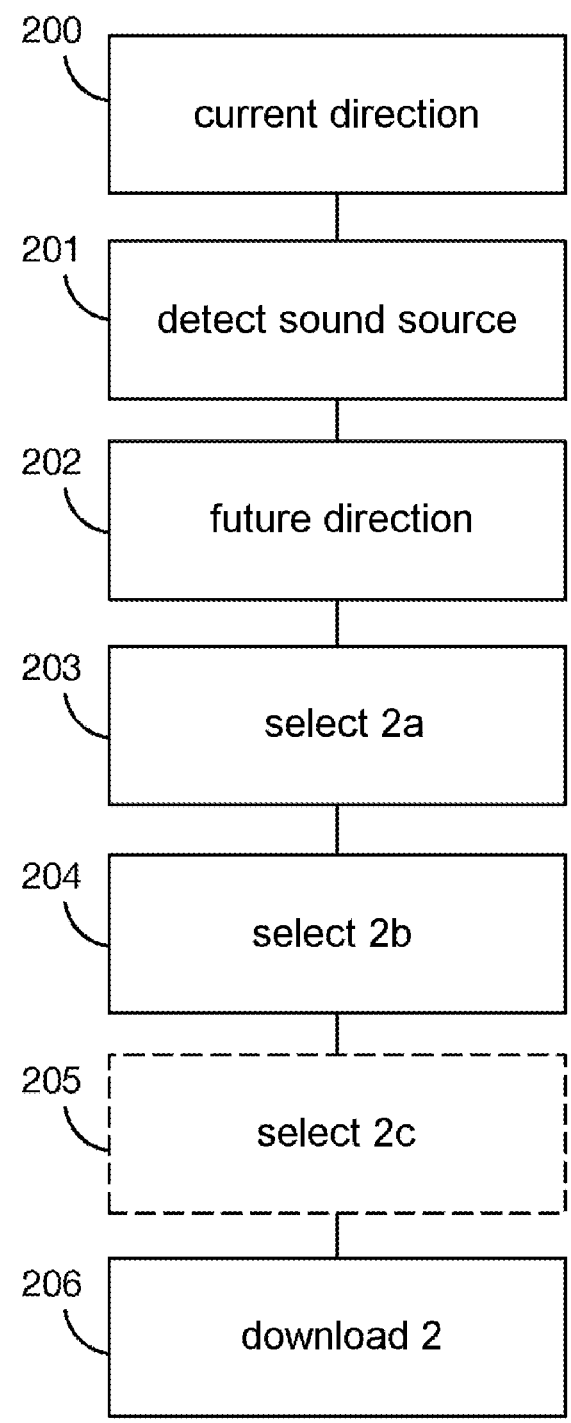
Figure 3:
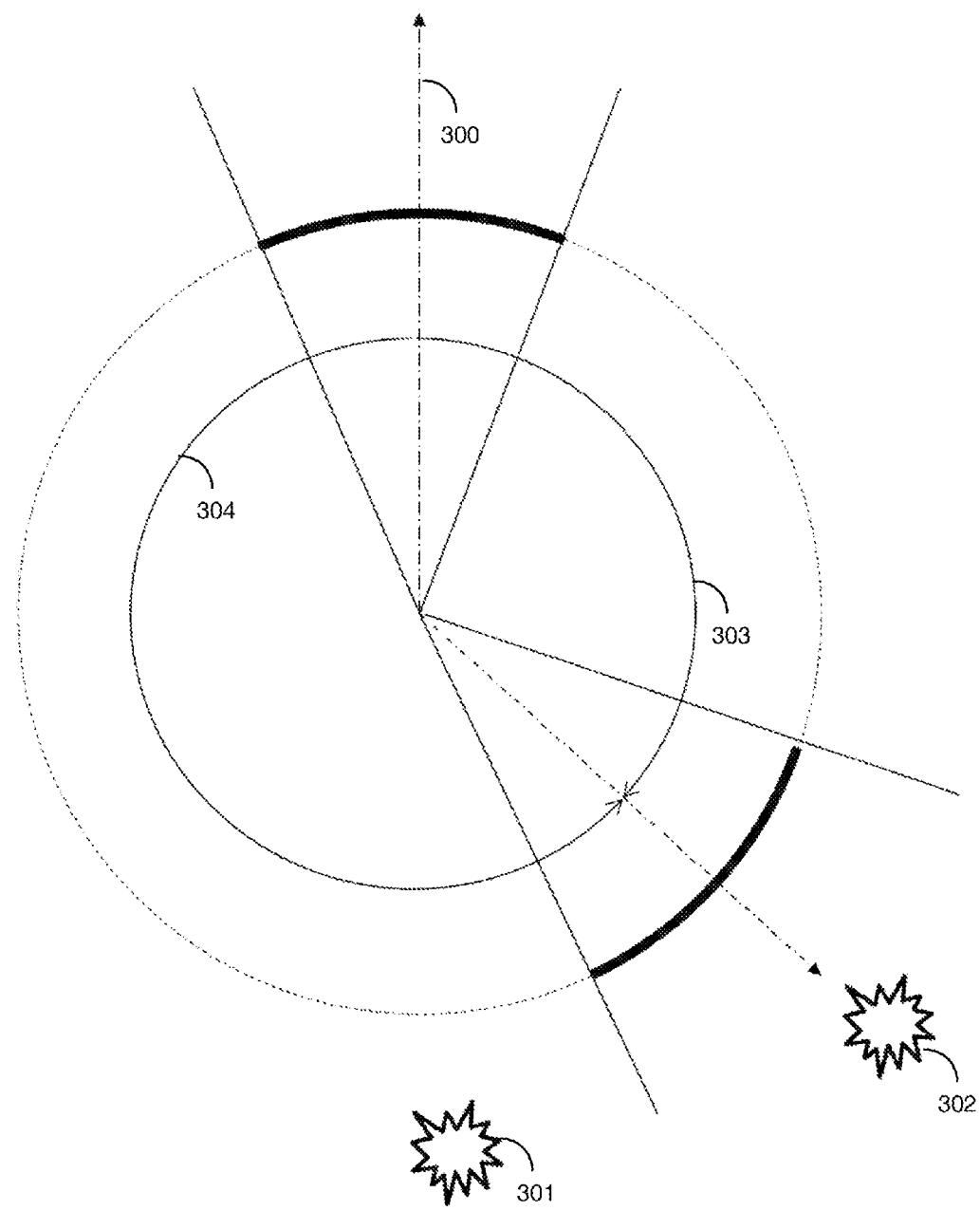
Figure 4:
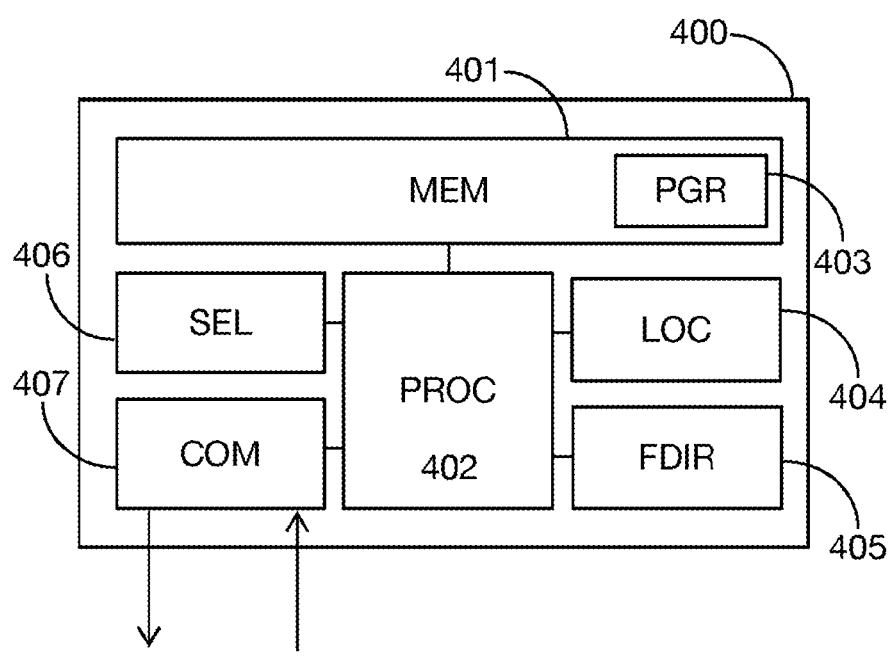

Other features and advantages of the invention will become more clearly apparent from reading the following description of one particular embodiment, given by way of simple illustrative and nonlimiting example, and the appended drawings, in which:

FIGS. 1a and 1b illustrate a user equipped with an immersive rendering device viewing panoramic audiovisual content, FIG. 2 illustrates the main steps of the selection method according to one particular embodiment of the invention, FIG. 3 illustrates a movement of a sound source in a spatialized audio scene, and FIG. 4 shows the architecture of a selection device according to one particular embodiment of the invention.

DETAILED DESCRIPTION

FIG. 1a shows a user 100 equipped with a virtual reality headset (or virtual headset) 101. The virtual headset is equipped with motion sensors, not shown, such as for example a gyroscope for measuring an angle of rotation of the virtual headset 100 with respect to a reference position 102. The user 100 is oriented in a direction 103 forming an angle 104 with respect to the reference position 102.

The term "virtual headset" used in this disclosure is not limiting. It may be for example a virtual headset associated with a processing terminal such as a personal computer or a smartphone mobile terminal. The virtual headset 101 may also be a passive optical equipment worn by the user and into which a smartphone or tablet mobile terminal is inserted. Such a virtual headset may be an augmented reality headset or a pair of connected glasses designed to display content superimposed with the elements of the real world that are perceived by the user.

The virtual headset 101 furthermore comprises a screen designed to render panoramic video content, such as for example the panoramic content 120 illustrated in FIG. 1b. The video content is for example 360-degree panoramic video content consulted from a server hosting the content. The content is thus downloaded and rendered live in the headset 101. The content is for example transmitted to the headset 101 using an adaptive streaming protocol in accordance with the MPEG-DASH (Dynamic Adaptive Streaming over http) standard, and in particular with the MPEG-DASH SRD (Spatial Relationship Description) standard. The video content may be encoded in accordance with the HEVC standard, and take advantage of encoding by independent tiles.

The virtual headset is furthermore configured so as to display only a portion of the panoramic video corresponding to a direction of observation (103, 108) and a field of view (106, 109) of the user. Thus, by virtue of the motion sensors, the virtual headset is able to display, at all times, the portion of the video corresponding to the current orientation of the user. The user is thus immersed in the audiovisual content that he is consulting and is able to turn around in order to observe the audiovisual content in all directions. The image portions or video portions are for example as defined in the H.265 standard, or else slices as defined in other video compression formats such as H.264 for example. Whether they are tiles, slices or any other video portions or image portions, the downloaded image portions are encoded so as to be able to be decoded independently of one another. In this way, the portion of the image visible in the virtual headset when the user is oriented in a particular direction is able to be decoded without the other portions of the image being downloaded.

In FIG. 1a, the user is oriented in a direction of observation 103. On the basis of this direction of observation 103 and of the user's field of view 106, the virtual headset selects a portion 121 of the image 120 to be rendered in the headset. Thus, only the image portions displayed in the virtual headset are downloaded, thereby making it possible to optimize the bandwidth necessary to consult the online content. However, when the user quickly changes direction of observation, the images corresponding to this new direction have to be downloaded. The transfer time for these new image data causes an offset between the display and the direction in which the user is looking. This latency impairs the feeling of immersion that is supposed to be provided by the device 101. To overcome this drawback, one solution consists in downloading all of the image portions forming the video in a reduced quality so as to anticipate any rotation of the user. To improve the quality when the direction of the user has stabilized, the images corresponding to the direction observed by the user are downloaded on the basis of a representation of the content having a higher quality. Such a provision makes it possible to overcome the latency problems caused by rapid movements of the user, while still providing an image, albeit of reduced quality, but without latency. A good-quality image being downloaded when the position has stabilized.

In parallel, when the audio component of the audiovisual content is rendered in an audio headset, a rotation is applied to the spatialized sound so as to match the position of the sound sources to the orientation of the user.

The invention provides an improvement by proposing to more acutely anticipate the changes of orientation of the user. The inventive concept consists in analyzing an audio component of the content currently being rendered and determining audio events likely to attract the attention of the user and to make him turn toward the origin of the sound event, in order then to download in advance the images that will have to be displayed if the user turns toward the origin of the noise. For example, a sudden noise caused by an object outside of the user's field of view will in most cases provoke a change of orientation of the user, who will position himself, by reflex, facing the origin of the noise. The invention makes it possible to anticipate this turning around by downloading the image data corresponding to this new position in advance. This makes it possible to reduce latency while at the same time preserving quality and a low bandwidth, since the images are already download at the time when the user turns around.

The invention is described according to one simplified embodiment taking, as an example, a cylindrical panoramic video formed for example by assembling various photographic shots on a horizontal plane. Such a video gives a spectator the possibility of moving over 360° to the horizontal by virtue of an appropriate rendering device, such as a virtual headset or a 360 projection room. However, the invention also applies to spherical or cubic panoramic content giving a spectator the possibility of moving over 360° to the horizontal and 180° to the vertical in a virtual sphere, using an appropriate rendering device, such as a virtual headset including motion sensors designed to measure, in addition to a horizontal angular speed, an incline with respect to the ground. In such an embodiment, the user 100 is able to orient himself in any direction in order to observe portions of content that are situated all around him, above him or below him.

The audiovisual content also comprises a spatialized audio component. Such a spatialized audio component allows the user to perceive sounds around him. For example, the noise 107 shown in FIG. 1a is perceived by the user 100 as coming from the right, when he is oriented in a direction of observation 103.

The various steps of the selection method will now be described, with reference to FIG. 2, according to a first embodiment in which the method is implemented on a panoramic rendering device, such as for example a virtual headset. Of course, the method may be implemented on a terminal associated with the virtual headset, such as for example a gaming console or a portable computer to which the virtual headset is connected.

In a first step 200, a current direction of observation of the user is determined. This direction may correspond to an angle with respect to a reference direction. This direction is determined by at least one motion sensor associated with the rendering device, such as for example a gyroscopic sensor and/or an accelerometer that are integrated into a virtual headset. The direction may also be determined using a camera designed to capture images of a user, analyze them and determine the direction in which he is looking. Such gaze tracking algorithms are known.

With reference to FIG. 1a, the direction of observation 103 of the user 100 is determined using gyroscopic sensors integrated into the virtual headset 101. This direction corresponds to an angle of rotation between a reference direction 102 and the current direction 103. As a variant, the direction of observation may be determined by analyzing the eye movements of a user, and in particular by determining a direction in which the user is looking. Methods for determining a gaze direction are known, and several technologies are available to a person skilled in the art for determining a direction in which a user is looking.

In step 201, a spatialized audio component of the audiovisual content is analyzed so as to determine the location of a sound source with respect to the current direction of observation of the user.

According to a first variant, called "channel-based", the rendering device analyzes the audio signal of each of the channels in order to determine, in a simple implementation, a direction corresponding to the speaker whose power is highest. To this end, the spatialized audio component includes at least two channels. Another method for locating a sound source on the basis of multichannel audio data is given in the document "A method to convert stereo to multi-channel sound", Roy Irwan and Ronald M. Aarts, AES 19TH INTERNATIONAL CONFERENCE, SCHLOSS ELMAU, GERMANY, 2001 Jun. 21{24.

"Spatialized audio component" is understood to mean an audio component of the audiovisual content including at least two channels whose signal is configured so as to allow a listener to perceive the origin of a particular sound with respect to his orientation. In the simplest example, this is a stereo component designed to render sounds to the left or to the right of the listener. In the most sophisticated variants, the audio component may be a 5.1 stream including audio signals intended for 5 speakers and a subwoofer that are positioned around the listener in a predefined way, a 5.1.2 stream furthermore comprising two elevated speakers, or else a component including any number of channels. The spatialized audio component thus allows a listener to immerse himself in an audio scene. Such a spatialized audio scene is associated with a panoramic video, such as for example a 360-degree video. It is thus possible to match the origin of the sounds perceived by the user with visual objects in the video in order to further improve the feeling of immersion. When the audio scene is rendered in an audio headset, the terminal applies a rotation to the scene so as to match it to the orientation of the user.

According to a second variant, called "object-based", the rendering device obtains location information of a sound source on the basis of metadata associated with the audio component, often mono in the "object-based" variant, of the audiovisual content. Such metadata may be contained within the audio component and make it possible to associate coordinates with a particular sound object. For example, in the case of an audio component in the AC4 format (ETSI TS 103 190-2. Digital Audio Compression (AC-4) Standard, Part 2: Immersive and personalized audio), metadata in the form of coordinates in a 3-dimensional reference frame of the type pos3D_X, pos3D_Y, pos3D_Z are associated with a particular sound object. In accordance with the MPEG-H standard (MPEG-H 3DAudio, ISO-IEC_23008-3), these metadata denote the location of a particular sound object in the form of azimuth, elevation and radius polar coordinates. The rendering device is thus able to easily obtain the position of the various sound sources forming the spatialized scene.

According to a third variant, called "scene-based", the audio component is in the "annbisonic" or HOA for "higher order annbisonic" format (J. Daniel, "Représentation de champs acoustiques, application à la transmission et à la reproduction de scènes sonores complexes dans un contexte multimedia" [Representation of acoustic fields, application to the transmission and to the reproduction of complex sound scenes in a multimedia context], PhD Thesis, 200).

In this technology, the sound field is broken down in the form of spherical harmonics. Thus, rather than transmitting the channels that have to feed loudspeakers placed at very specific positions, audio signals called "annbisonic components" transport (in the form of an amplitude difference between components) the information of the sound field that has to be rendered through speakers placed at arbitrary positions: HOA spatial decoding therefore makes it possible to adjust the rendering to a particular layout of the speakers. The HOA format thus possesses all of the information about the sound sources, but not in a manner able to be exploited directly as in the second variant. It is therefore necessary to analyze the sound scene in order to extract the position of the sources. Such analysis of the sound scene may be based on the behavior of the velocity vector or of the power vector, which may point in the direction of a point source (see J. Daniel, "Evolving views on HOA: from technological to pragmatic concerns", AMBISONICS SYMPOSIUM 2009, June 25-27, Graz and Juha Vilkamo, "Spatial Sound Reproduction with Frequency Band Processing of B-format Audio Signals", Master's Thesis, Espoo, May 28, 2008). This analysis may be performed in the time domain or, for greater precision or robustness, in the time-frequency domain.

Hybrid approaches are also possible: the transmission of a sound scene in a multichannel or HOA approach may involve decomposition into sound sources accompanied by metadata (the sound sources are extracted by analyzing the multichannel signal and information about their locations accompanies them); this case is equivalent to the one disclosed in the "object-based" approach, since position information is already accessible by analyzing the scene as performed during the audio encoding. Depending on the type of information available, it will possibly be necessary to perform processing in order to extract relevant spatial information (for example angular information). For example, the MPEG Surround codec, which is a "channel-based" codec, may, during the encoding, extract spatial information based on interchannel level differences that may be used to determine the position of a source. Similarly, the MPEG-H 3D Audio codec, which supports HOA, may, during the encoding, extract spatial information (that is to say the active directional signals) that may be used to determine the position of a source.

The position of a sound source may also be determined on the basis of an initial location of the source determined by any one of the methods disclosed above and of speed and direction of movement information associated with said source. The speed and the direction of the source may be obtained on the basis of metadata, of analysis of the audio signal and/or of analysis of a visual object in the video associated with the sound source. The quality of the video may then be adapted to the speed of movement by downloading the image portions on the basis of a representation encoded at a particular bit rate. Thus, when for example the speed of movement of the sound source is fast, the visible image portions on the journey may be downloaded on the basis of a low-quality representation, as the user following the sound source will not have time to pay attention to details. As a variant, the quality may be gradually increased or reduced by downloading image portions on the basis of representations encoded at various qualities.

FIG. 1a illustrates a sound source 107 positioned to the right of the user when said user is observing the scene in the direction 103.

In step 202, at least one future direction of observation is determined on the basis of the location of a sound source. This future direction of observation corresponds for example to the amplitude of a rotation from a reference direction to a direction pointing toward the location, determined in step 201, of the sound source.

In step 203, the virtual reality headset 101 determines portions of the panoramic image 120 that are visible when the user is looking in the current direction of observation 103. The visible portions of the image are selected on the basis of the direction 103, of the field of view 106 and of the projection distance of the image 120. Thus, on the basis of simple calculations that are well known to those skilled in the art, the headset 101 is able to determine the coordinates of the area of the image 120 that has to be displayed in the virtual headset. FIG. 1b thus illustrates a panoramic image 120 in which there is selected an area 121 visible in the virtual headset 101 when the user is observing the scene in the direction 103 with a field of view 106.

In step 204, the virtual reality headset 101 determines portions of the panoramic image 120 that are visible when the user is looking in the future direction of observation 108 determined in step 202. This direction corresponds to the gaze direction of the user when he is positioned facing the sound source whose location is determined in accordance with step 201. The direction 108 corresponds to an angle of rotation 110 with respect to the initial direction 102. The visible portions of the image are selected on the basis of the direction 108, of the field of view 109 and of the projection distance of the image 120. Thus, on the basis of identical calculations to those performed in step 203 and that are well known to those skilled in the art, the headset 101 is able to determine the coordinates of the area of the image 120 that has to be displayed in the virtual headset when the user orients himself so as to face the sound source 107.

FIG. 1b thus illustrates a panoramic image 120 in which there is selected an area 122 visible in the virtual headset 101 when the user is observing the scene in the direction 108 pointing toward the location of the sound source 107. The portions of the image corresponding to the area 122 that are thus identified may then be downloaded by anticipating a rotation of the user toward the sound source 107. In this way, the method makes it possible to optimize the use of the bandwidth necessary to download the data in order to render the audiovisual content by downloading only the data that are likely to be able to be viewed by the user.

In an optional step 205, a third portion of the image 123 is selected. This third image portion is selected on the basis of the current direction of observation 103 and of the future direction of observation 108 determined in the previous steps. In particular, the third image portion corresponds to an image portion situated between the image portion 121 selected in step 200 and the image portion 122 selected in step 203. For example, it is the portion 123 of the image 120. This portion is visible in the virtual headset when the user 100 performs a rotation to his right in order to position himself facing the sound source 107 and the direction of observation is contained within the sector 111 of FIG. 1a. Such a provision makes it possible to anticipate not only a future direction of observation depending on the location of a sound event in a spatialized scene, but also to download the images necessary to render the content during the rotation of the user toward the anticipated direction.

According to one particular embodiment, the third image portion corresponds to an image portion situated between the image portion selected in step 200 and the image portion selected in step 203, the third image portion being selected when it is contained within the user's field of view when the user performs an optimum rotation from the current direction of observation to the future direction of observation, it being understood that the rotation is said to be optimum when it minimizes the angle of rotation necessary to move from the current direction of observation to the future direction of observation. For example, with reference to FIG. 1a, the optimum movement for the user 100 to move from the direction of observation 103 to the direction of observation 109 is a rotation to the right, since a rotation in this direction minimizes the angle of rotation.

According to one particular implementation of the invention, the determined location of the sound source is modified such that the user is incited to perform a rotation in a particular direction. For example, when a sound source is located at 180° with respect to the current direction of observation of the user 100, it is not possible to anticipate the direction of rotation that the user will choose in order to turn around, since the two movements (to the left or to the right) require a rotation of the same amplitude. To incite the user to turn around in a particular direction that it is possible to anticipate, the invention proposes to modify the location of the sound source in the spatialized audio scene such that the user 100 is able to perceive it as coming from a particular side, for example as being located to his right. The invention thus makes it possible to anticipate the direction of rotation of the user, thereby making it possible to improve the image quality when the user turns toward the audio source.

FIG. 3 illustrates such an embodiment in which the user is observing a 360° panoramic scene in a direction 300. When a sound event 301 is detected in a direction opposite the direction 300 toward which the user is looking, it is not possible to anticipate whether the user will turn around to the left or to the right in order to position himself facing the sound event. The method proposes to move the sound event from the location 301 to the location 302. In this way, the sound event is perceived by the user as occurring to his right, thereby inciting him to turn around taking the journey 303 rather than the journey 304. It thus becomes possible to anticipate the direction of rotation of the user in order to select the image portions necessary for viewing on this journey.

Such a movement of the sound source may be performed in various ways depending on the type of audio stream implemented in the audiovisual content. If the location of the sound sources is defined by metadata, the source may be moved by modifying these metadata. If the location is determined by analyzing various channels of the audio signal, such a movement of the source may be simulated by modifying the rendering volume of a particular channel. In the abovementioned example, the volume of a speaker situated to the right of the user may be increased so as to bolster the perception of the sound event to the right of the user.

In step 206, the image portions selected in steps 200, 202 and 203 are downloaded and displayed by the rendering device 101 according to the orientation of the user 100.

As a variant, the images or image portions that have not been selected according to the method are downloaded on the basis of a second representation of a first quality, for example a low quality, and the selected portions are downloaded on the basis of a representation of a second quality, for example a quality higher than the first quality. The method thus makes it possible to guarantee that an image is able to be displayed regardless of the orientation of the user, while at the same time anticipating the movements of the user in order to provide good-quality images in directions in which he is likely to turn around.

The virtual headset 101 may determine the audiovisual data segments corresponding to the orientation of the user on the basis of a descriptor file of the audiovisual content. Such a descriptor is for example an MDP (Media Presentation Description) manifest file comprising download links corresponding to various portions of a panoramic video depending on a particular direction of observation. Such a mechanism is implemented in the MPEG-DASH SRD (Spatial Relationship Description) standards and offers the possibility of describing a spatial arrangement of a plurality of portions of a video. The HEVC standard also defines tools for spatially arranging a plurality of portions of a video. The HEVC standard specifically makes it possible to divide a video into tiles able to be decoded independently of one another. In this way, a terminal is easily able to transmit a request to download the audiovisual data corresponding to a direction of observation determined in steps 200 and/or 202.

Without prejudice to the inventiveness of the solution, the functionalities described with reference to the virtual headset 101 may be distributed over a plurality of separate devices. For example, the virtual headset may be connected to a terminal such as a personal computer or a gaming console on which the steps of the method are executed, the headset making it possible to capture the movements of the user and render the audiovisual content. From the video viewpoint, it is possible to use a TV associated with a device for performing rotations, and from the audio viewpoint, it is possible to use real speakers or a simulation thereof binaurally fitted to the headset.

According to one particular implementation of the invention, steps 200, 203 and 206 are executed by the virtual headset and steps 201, 202, 204 and 205 are executed by a broadcast server from which the audiovisual content is downloaded in order to be viewed. In such an embodiment, when the broadcast server hosting the audiovisual content consulted by the user 100 receives a download request for a video portion corresponding to a particular direction of observation, it executes steps 201 and 202 described above in order to determine a future direction of observation in which the user 100 is likely to orient himself. The server receives such a request following the execution, by the terminal, of step 206, during which a download request for the data segments, corresponding to viewing in the direction of observation determined in step 200 and selected in step 203, is transmitted.

If a future direction of observation has been able to be determined in steps 201 and 202, the server executes steps 204 and/or 205 so as to select image portions or video segments corresponding to viewing of the content in the determined direction. To this end, the server has a descriptor in which video segments are associated with directions of observation. Thus, on the basis of a particular direction, the server determines the data that have to be transmitted to the virtual headset 101.

Thus, in response to the download request for the data corresponding to the received current direction of observation, the server transmits, in addition to the data requested in the download request, additional data corresponding to a future direction of observation in which the user is likely to orient himself.

FIG. 4 illustrates, according to one particular embodiment of the invention, a device 400 implementing the selection method.

The device comprises a storage space 401, for example a memory MEM, and a processing unit 402 equipped for example with a processor PROC. The processing unit may be driven by a program 403, for example a computer program PGR, implementing the selection method such as described in the invention with reference to FIG. 2, and in particular the steps of determining the location of a sound source in a spatialized audio component of the audiovisual content, of determining a future direction of observation on the basis of the determined location, of selecting at least one second portion of the image on the basis of the determined future direction of observation, and of downloading the selected image portions.

On startup, the instructions of the computer program 403 are for example loaded into a RAM memory (random access memory), before being executed by the processor of the processing unit 402. The processor of the processing unit 402 implements the steps of the organization method according to the instructions of the computer program 403.

The device 400 comprises communication means 407, such as for example a network interface COM, allowing the device to connect to a telecommunications network and to exchange data with other devices by way of the telecommunications network, and in particular to download portions of audiovisual content from a broadcast server. The communication means 407 correspond for example to a Wi-Fi or cellular wireless network interface, or else an Ethernet interface or any other type of network interface designed to exchange data with other equipment, and in particular with an audiovisual content broadcast server.

The device 400 also comprises location means 404 for locating a sound source on the basis of a spatialized audio component of an audiovisual stream. Such means may be implemented by computer program instructions configured so as to analyze a spatialized audio stream, such as for example a stereo or multichannel stream (for example a 5.1 or 5.1.2 stream) in order to determine the location of a sound source with respect to a position occupied by a listener. In particular, the location means 404 implement step 201 of the method described above. Such instructions are stored in a memory of the device, for example in the memory MEM, and executed by a processor, for example the processor PROC. The analysis may relate to the data of the audio stream or to metadata associated with the audio stream. The location of the sound source may be defined by a direction and a distance with respect to the listener, the direction corresponding to an angle with respect to a reference position.

The device 400 also comprises determination means 405 for determining a future direction on the basis of the location determined by the means 404. Such means may be implemented by computer program instructions stored in a memory, such as for example in the memory MEM, and executed by a processor, such as for example by the processor PROC. In particular, the determination means 405 for determining a future direction implement step 202 of the method such as described above.

The device 400 furthermore comprises selection means 406 for selecting at least one portion of the image on the basis of the future direction of observation determined by the means 405. Such selection means may be implemented by computer program instructions stored in a memory, such as for example in the memory MEM, and executed by a processor, such as the processor PROC. In particular, the selection means for selecting at least one portion of the image implement step 204 of the method such as described above. According to one particular embodiment, the selection means 406 implement step 205 described above.

The device 400 lastly includes means for downloading the image portions selected by the selection means 406. Such means may be implemented by the communication interface 407.

The invention claimed is:

1. A method comprising:
selecting at least one image portion to be downloaded in order to render audiovisual content by way of a rendering device, the selecting comprising the following acts performed by a selecting device:
determining a current direction of observation,
determining a location of a sound source in a spatialized audio component of the audiovisual content,
determining a future direction of observation on the basis of the determined location,
selecting at least one image portion of the content on the basis of the determined future direction of observation,
downloading the at least one selected image portion at a second bit rate, which is higher than a first bit rate, wherein the at least one selected image portion furthermore comprises image portions visible from at least one intermediate direction of observation between the current direction of observation and the determined future direction of observation, and
downloading at least one other image portion of the content at the first bit rate.

2. The method as claimed in claim 1, wherein the location of the sound source on the basis of which the future direction of observation is determined is determined by analyzing at least one audio component of the audiovisual content.

3. The method as claimed in claim 1, wherein the location of the sound source on the basis of which the future direction of observation is determined is determined by metadata associated with one or more audio components of the audiovisual content.

4. The method as claimed in claim 1, further comprising:
receiving data coming from sensors associated with the rendering device,
wherein the current direction of observation is obtained on the basis of the data coming from the sensors associated with the rendering device.

5. The method as claimed in claim 4, wherein the intermediate direction of observation corresponds to a direction of observation between the current direction of observation and the future direction of observation when a user performs a rotation from the current direction of observation to the future direction of observation, in a direction that minimizes the amplitude of this rotation.

6. The method as claimed in claim 4, wherein the determined location of the sound source is modified such that the user is incited to perform at least one rotation in a particular direction in order to orient the user toward the sound source.

7. The method as claimed in claim 1, wherein:
the location of the sound source is determined on the basis of an initial location of the source and speed and direction of movement information associated with said source, and
quality of the audiovisual content is adapted to the speed of the movement information by downloading the image portions on the basis of a representation encoded at a particular bit rate.

8. A device for selecting at least one image portion to be downloaded in order to render audiovisual content by way of an immersive rendering device, the device comprising:
a processor; and
a non-transitory computer-readable medium comprising instructions stored thereon which when executed by the processor configure the device to perform acts comprising:
determining a current direction of observation,
determining a location of a sound source in a spatialized audio component of the audiovisual content,
determining a future direction of observation on the basis of the determined location,
selecting at least one image portion of the content on the basis of the determined future direction of observation,
downloading the at least one selected image portion at a second bit rate, which is higher than a first bit rate, wherein the at least one selected image portion furthermore comprises image portions visible from at least one intermediate direction of observation between the current direction of observation and the determined future direction of observation, and
downloading at least one other image portion of the content at the first bit rate.

9. The device as claimed in claim 8, wherein the device for selecting is implemented in the immersive rendering device.

10. The device as claimed in claim 8, wherein the device for selecting is implemented in a broadcast server.

11. A non-transitory computer-readable information medium on which a computer program comprising instructions is recorded, which when executed by a processor of a selection device configure the selection device to perform acts comprising:
selecting at least one image portion to be downloaded in order to render audiovisual content by way of a rendering device, the selecting comprising:
determining a current direction of observation,
determining a location of a sound source in a spatialized audio component of the audiovisual content,
determining a future direction of observation on the basis of the determined location,
selecting at least one image portion of the content on the basis of the determined future direction of observation,
downloading the at least one selected image portion at a second bit rate, which is higher than a first bit rate, wherein the at least one selected image portion furthermore comprises image portions visible from at least one intermediate direction of observation between the current direction of observation and the determined future direction of observation, and
downloading at least one other image portion of the content at the first bit rate.

* * * * *